(12) United States Patent
Akahane et al.

(10) Patent No.: US 9,062,721 B2
(45) Date of Patent: Jun. 23, 2015

(54) DRIVE FORCE TRANSMISSION DEVICE

(71) Applicant: Nissan Motor Co., Ltd., Yokohama, Kanagawa (JP)

(72) Inventors: Masakazu Akahane, Hachioji (JP); Tatsuya Akimoto, Ebina (JP); Hideaki Inokuchi, Yokohama (JP); Shigeru Ishii, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/361,070

(22) PCT Filed: Dec. 6, 2012

(86) PCT No.: PCT/JP2012/081596
§ 371 (c)(1),
(2) Date: May 28, 2014

(87) PCT Pub. No.: WO2013/084970
PCT Pub. Date: Jun. 13, 2013

(65) Prior Publication Data
US 2014/0332336 A1    Nov. 13, 2014

(30) Foreign Application Priority Data
Dec. 7, 2011    (JP) .................................. 2011-267784

(51) Int. Cl.
| F16D 13/72 | (2006.01) |
| F16D 25/12 | (2006.01) |
| F16D 13/52 | (2006.01) |
| F16H 57/031 | (2012.01) |
| F16D 25/0638 | (2006.01) |
| F16H 57/027 | (2012.01) |

(52) U.S. Cl.
CPC .............. *F16D 13/52* (2013.01); *F16H 57/027* (2013.01); *F16H 57/031* (2013.01); *F16D 13/72* (2013.01); *F16D 25/0638* (2013.01); *F16D 25/123* (2013.01)

(58) Field of Classification Search
None
See application file for complete search history.

(56) References Cited

U.S. PATENT DOCUMENTS

2008/0099258 A1*    5/2008    Berhan ........................ 180/65.2

FOREIGN PATENT DOCUMENTS

| JP | 7-29333 U | 6/1995 |
| JP | 2010-151313 A | 7/2010 |
| JP | 2010-242824 A | 10/2010 |
| JP | 2012-21552 A * | 2/2012 |
| WO | 2012/029441 A1 | 3/2012 |

\* cited by examiner

*Primary Examiner* — Rodney H Bonck
(74) *Attorney, Agent, or Firm* — Global IP Counselors, LLP

(57) ABSTRACT

In a drive force transmission device, a dry multi-plate clutch is disposed in a closed space for connecting and disconnecting a transmission of drive force. The dry multi-plate clutch includes a drive plate, a driven plate, a frictional face, a front cover and a splash guard. The drive plate is splined to a clutch hub. The driven plate is splined to a clutch drum. The front cover has an air intake port for taking external air into the closed space, and an air venting port for ejecting an air stream from within the closed space to the external air. The splash guard covers the air intake port and the air venting port of the front cover. The splash guard has an opening for drawing in external air through the air intake port and venting an air stream through the air venting port.

3 Claims, 7 Drawing Sheets

DRIVE FORCE TRANSMISSION DEVICE

CROSS-REFERENCE TO RELATED APPLICATIONS

This application is a U.S. National stage application of International Application No. PCT/JP2012/081596, filed Dec. 6, 2012, which claims priority to Japanese Patent Application No. 2011-267784 filed in Japan on Dec. 7, 2011, the contents of which are hereby incorporated herein by reference.

BACKGROUND

1. Field of the Invention

The present invention relates to a drive force transmission device, applied to a vehicle drivetrain, in which a dry clutch for connecting and disconnecting drive force transmission is disposed within a closed space.

2. Background Information

A hybrid drive force transmission device in which an engine, a motor, a clutch unit, and a transmission unit are coupled and connected to each other is known in the art. For the motor and the clutch unit, a dry multi-plate clutch is disposed inside an electric motor. Specifically, there are provided a clutch hub coupled to an output shaft of the engine, a clutch drum to which a rotor of the electric motor is affixed and which is coupled to an input shaft of the transmission, and a dry multi-plate clutch interposed between the clutch hub and the clutch drum (see, for example, Unexamined Japanese Patent Application Publication No. 2010-151313).

SUMMARY

However, the dry multi-plate clutch of this conventional hybrid drive force transmission device is covered by a unit housing and housed within a dry space sealed by a seal member. As a result, wear debris from the frictional face generated by repeated clutch engagement and disengagement must be ejected from the dry space in order to prevent wear debris-induced scraping. One possible method of doing this would be to provide a hole in a cover member of the dry multi-plate clutch; however, this would create the problem that, if water were to infiltrate the damper chamber, water drawn up by the rotation of the damper would infiltrate into the clutch chamber through the hole provided in the cover member. On the other hand, covering the hole entirely would lead of the problem of being incapable of ejecting wear debris.

The present invention was conceived in view of the problems described above, it being an object thereof to provide a drive force transmission device that is capable of preventing water from infiltrating into a closed space in which a dry clutch is disposed and ensuring that dry clutch wear debris can be ejected outside.

In order to achieve the abovementioned object, the present invention is a drive force transmission device that comprises a clutch hub, a clutch drum member, a damper and a dry clutch. The damper is arranged to attenuate variations in a drive force from a drive source. The dry clutch is disposed within a closed space between the clutch hub and the clutch drum for selectively connecting and disconnecting the drive force. The dry clutch includes a first clutch plate, a second clutch plate, a cover member and a splash guard. The first clutch plate is connected to the clutch hub. The second clutch plate is connected to the clutch drum. One of the first and second clutch plates has a frictional surface that is pressed against a surface of the other of the first and second plates when the dry clutch is engaged. The cover member has an air intake port arranged to draw external air into the closed space, and an air venting port arranged to vent an air stream from the closed space into the external air. The splash guard includes a covering guard surface overlying the air intake port and the air venting port of the cover member, and a side guide surface having an opening arranged to draw in the external air through the air intake port and arranged to vent the air stream from the air venting port. The damper is disposed at a position outside of the splash guard. The side guard surface is closed along an upstream portion with respect to a rotational direction of the damper. The opening is located along a downstream portion with respect to the rotational direction of the damper.

As described above, the cover member disposed on the side of the dry clutch comprises an air intake port for introducing external air into the closed space and an air venting port for venting an air stream from the closed space into the external air. The cover member is provided with a splash guard that covers the air intake port and the air venting port and comprises an opening. As a result, any water potentially infiltrating from the exterior through the air intake port or air venting port provided in the cover member into the closed space in which the dry clutch is disposed is prevented from infiltrating the closed space by the splash guard. The splash guard comprises an opening allowing for communication with the external air and covers the air intake port and the air venting port, and thus does not impede the generation of an air stream for ejecting wear debris from the surface of the frictional face to the exterior. Specifically, the pressure relationship engendered by the air pressure on the outer diameter side of the clutch being greater than the atmospheric pressure, which is in turn greater than the air pressure on the inner diameter side of the clutch generates an air stream that flows along a path going from the external air through the opening, the air intake port, a clutch inner diameter-side axial direction gap, a clutch radial direction gap, a clutch outer diameter side axial direction gap, the air venting port, the opening, and back to the external air. As a result, it is possible to prevent water from infiltrating a closed space in which a dry clutch is disposed and ensure that dry clutch wear debris can be ejected outside.

BRIEF DESCRIPTION OF THE DRAWINGS

Referring now to the attached drawings which form a part of this original disclosure.

DETAILED DESCRIPTION OF THE EMBODIMENTS

Figure 1:
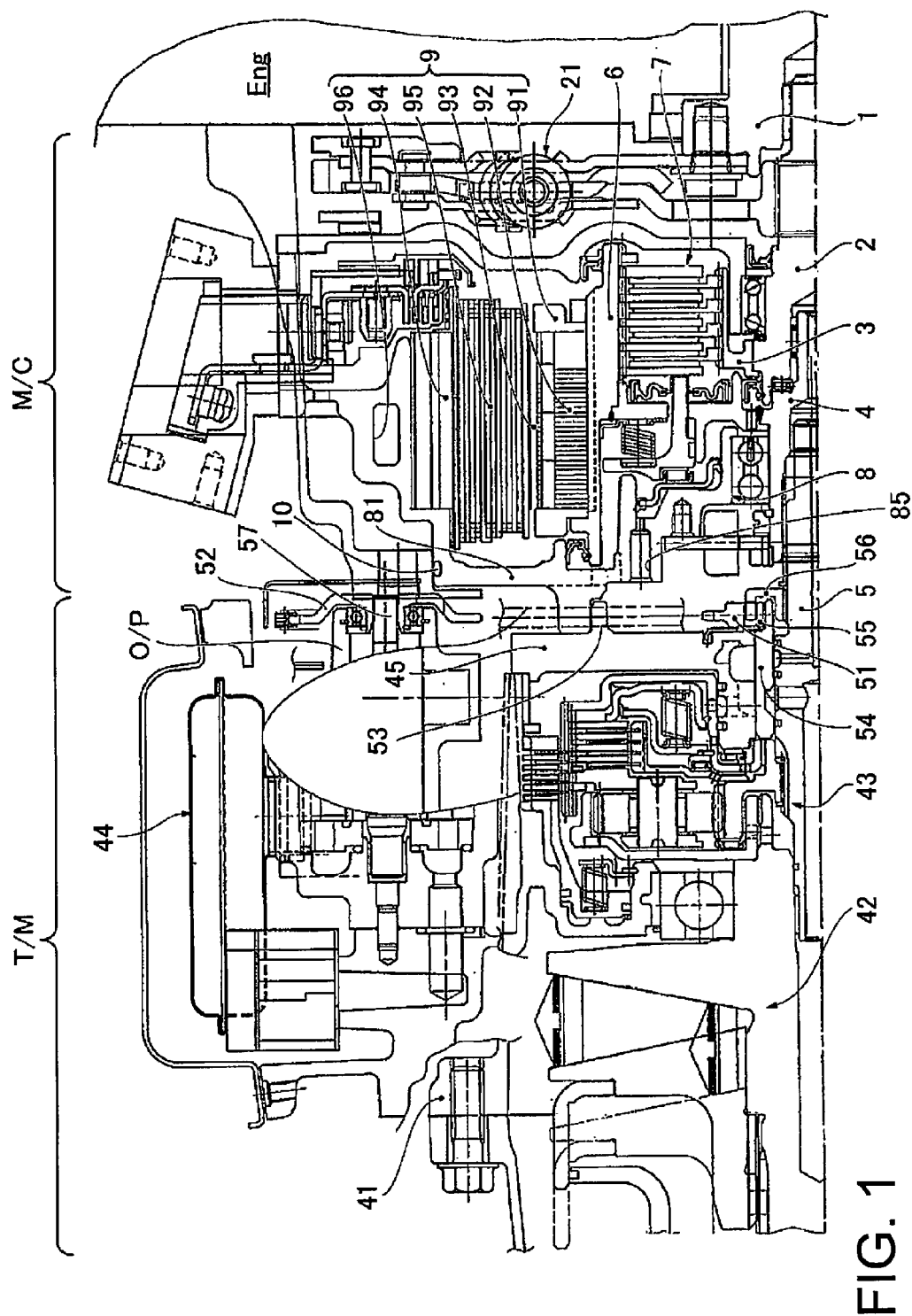
FIG. 1 is an overall schematic view of a hybrid drive force transmission device (an example of a drive force transmission device) according to a first embodiment.

The following is a description of a best mode for carrying out the drive force transmission device according to the present invention on the basis of a first embodiment and a second embodiment shown in the drawings.

First Embodiment

First, the configuration of the first embodiment will be described. The description of the configuration of the hybrid drive force transmission device according to the first embodiment will be divided into the overall configuration, the configuration of the motor and clutch unit, the configuration of the dry multi-plate clutch, and the ejection of wear debris by an air stream effect.

Overall Configuration

FIG. 1 is an overall schematic view of a hybrid drive force transmission device (an example of a drive force transmission device) according to a first embodiment. The overall configuration of the device will now be described with reference to FIG. 1.

As shown in FIG. 1, the hybrid drive force transmission device according to the first embodiment is provided with an engine Eng (drive source), a motor and clutch unit M/C, a transmission unit T/M, an engine output shaft 1, a clutch hub shaft 2, a clutch hub 3, a clutch drum shaft 4, a transmission input shaft 5, a clutch drum 6, a dry multi-plate clutch 7 (dry clutch), a slave cylinder 8, and a motor/generator 9. The slave cylinder 8, which hydraulically controls the engagement and disengagement of the dry multi-plate clutch 7, is generally referred to as a concentric slave cylinder (CSC).

In the hybrid drive force transmission device according to the first embodiment, when the normally open dry multi-plate clutch 7 is disengaged, the motor/generator 9 and the transmission input shaft 5 and coupled by the clutch drum 6 and the clutch drum shaft 4, putting the vehicle into electric driving mode. When the dry multi-plate clutch 7 is hydraulically engaged by the slave cylinder 8, the engine Eng and motor/generator 9 and the engine output shaft 1 and clutch hub shaft 2 are coupled by a damper 21. The clutch hub 3 and the clutch drum 6 are coupled by the engaged dry multi-plate clutch 7 to put the vehicle into hybrid driving mode.

The motor and clutch unit M/C comprises the dry multi-plate clutch 7, the slave cylinder 8, and the motor/generator 9. The dry multi-plate clutch 7 is coupled and connected to the engine Eng, and connects and disconnects the transmission of drive force from the engine Eng. The slave cylinder 8 hydraulically controls the engagement and disengagement of the dry multi-plate clutch 7. The motor/generator 9 is disposed at a position on the outer circumference of the clutch drum 6 of the dry multi-plate clutch 7, and engages in the transmission of motive force with the transmission input shaft 5. The motor and clutch unit M/C is provided with a cylinder housing 81 comprising a first clutch pressure fluid passage 85 leading to the slave cylinder 8, the seal integrity of the housing being maintained by an 0-ring 10.

The motor/generator 9 is a synchronous AC electric motor, and comprises a rotor support frame 91 provided integrally with the clutch drum 6, and a rotor 92, supported by and affixed to the rotor support frame 91, in which a permanent magnet is embedded. Also comprised are a stator 94 affixed to the cylinder housing 81 and separated from the rotor 92 by an air gap 93, and a stator coil 95 wound around the stator 94. A water jacket 96 through which cooling water is flushed is formed on the cylinder housing 81.

The transmission unit T/M is coupled and connected to the motor and clutch unit M/C, and comprises a transmission housing 41, a V-belt continuously variable transmission mechanism 42, and an oil pump O/P. The V-belt continuously variable transmission mechanism 42 is built into the transmission housing 41 and features a V-belt wrapped between two pulleys; an infinite number of gear ratios can be obtained by altering the belt contact radius of the pulleys. The oil pump O/P is a hydraulic pressure source for generating hydraulic pressure required at various locations, and, using oil pump pressure as source pressure, directs hydraulic pressure from a control valve, not shown in the drawings, for adjusting various types of pressure, such as gear shift hydraulic pressure supplied to the pulley chambers or clutch/brake hydraulic pressure, to locations where hydraulic pressure is required. The transmission unit T/M is further provided with a forward/reverse switching mechanism 43, an oil tank 44, and an endplate 45. The endplate 45 comprises a second clutch pressure fluid passage 47 (FIG. 2).

The oil pump 0/P is driven by rotational drive torque from the transmission input shaft 5 via a chain drive mechanism. The chain drive mechanism comprises a drive-side sprocket 51 that rotates in tandem with the rotational driving of the transmission input shaft 5, a driven-side sprocket 52 for rotationally driving a pump shaft 57, and a chain 53 wrapped around the sprockets 51, 52. The drive-side sprocket 51 is interposed between the transmission input shaft 5 and the endplate 45, and is supported by a bushing 55 so as to be capable of rotating with respect to a stator shaft 54 affixed to the transmission housing 41. Rotational drive torque from the transmission input shaft 5 is transmitted by a first adapter 56 that mates via a spline with the transmission input shaft 5 and mates via a claw with the drive-side sprocket 51.

Configuration of Motor and Clutch Unit

Figure 2:
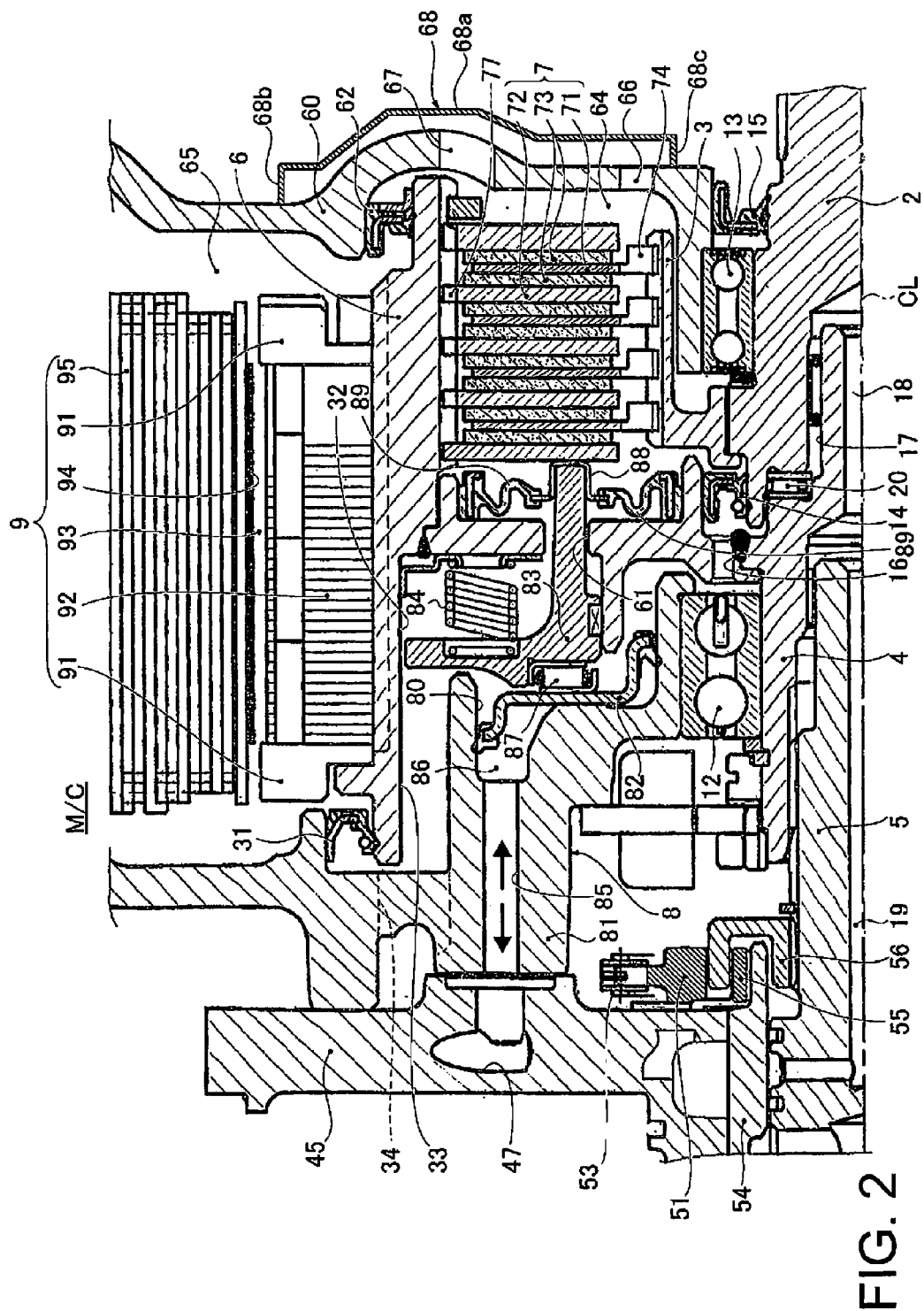
FIG. 2] A cross-sectional view of the main parts of a motor and clutch unit of the hybrid drive force transmission device according to the first embodiment.
Figure 3:
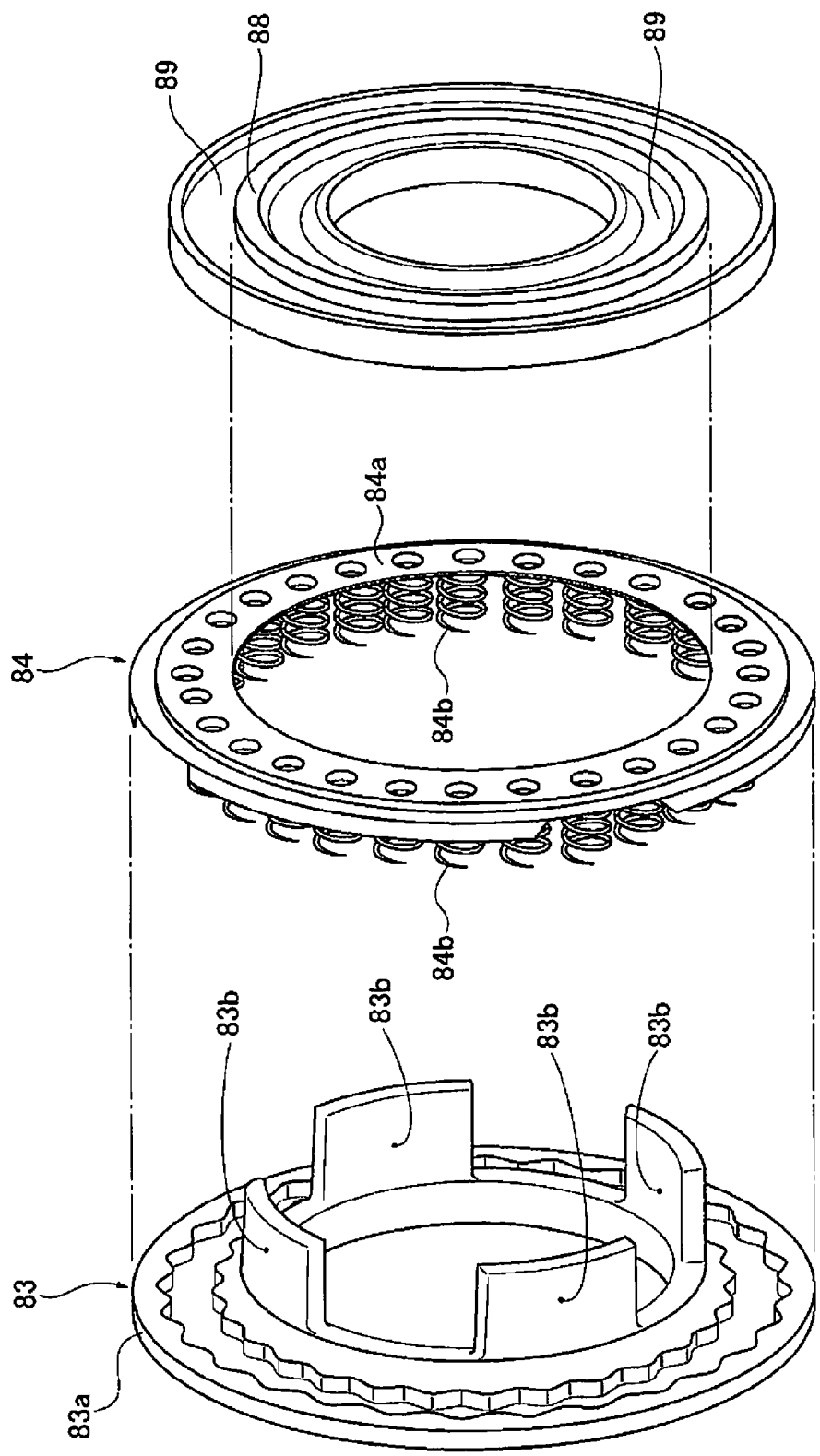
FIG. 3 is an exploded perspective view of piston assembly pieces for a dry multi-plate clutch of the hybrid drive force transmission device according to the first embodiment.

FIG. 2 is a cross-sectional view of the main parts of a motor and clutch unit of the hybrid drive force transmission device according to the first embodiment, and FIG. 3 is an exploded perspective view of piston assembly pieces for a dry multi-plate clutch of the hybrid drive force transmission device according to the first embodiment. The configuration of the motor and clutch unit M/C will now be described with reference to FIGS. 2 and 3.

The clutch hub 3 is coupled to the engine output shaft 1 of the engine Eng. A drive plate 71 (first clutch plate) of the dry multi-plate clutch 7 is splined to the clutch hub 3, as shown in FIG. 2.

The clutch drum 6 is coupled to the transmission input shaft 5 of the transmission unit T/M. A driven plate 72 (second clutch plate) of the dry multi-plate clutch 7 is splined to the clutch drum 6, as shown in FIG. 2.

The dry multi-plate clutch 7 is configured by alternately arranging a plurality of drive plates 71, to both sides of which are attached frictional faces 73, 73, and driven plates 72 between the clutch hub 3 and the clutch drum 6. Engaging the dry multi-plate clutch 7 allows torque to be transmitted between the clutch hub 3 and the clutch drum 6, and releasing the dry multi-plate clutch 7 interrupts the transmission of torque between the clutch hub 3 and the clutch drum 6.

The slave cylinder 8 is a hydraulic actuator for controlling the engagement and disengagement of the dry multi-plate clutch 7, and is disposed at a position between the transmission unit T/M and the clutch drum 6. As shown in FIG. 2, the slave cylinder 8 comprises a piston 82 capable of sliding in a cylinder hole 80 in the cylinder housing 81, a first clutch pressure fluid passage 85, formed in the cylinder housing 81, for directing clutch pressure generated by the transmission unit T/M, and a cylinder fluid chamber 86 communicating with the first clutch pressure fluid passage 85. As shown in FIG. 2, a needle bearing 87, a piston arm 83, a return spring 84, and an arm indentation plate 88 are interposed between the piston 82 and the dry multi-plate clutch 7.

The piston arm 83 generates pressure for the dry multi-plate clutch 7 from the pressure from the slave cylinder 8, and is capable of sliding in a through-hole 61 formed in the clutch drum 6. The return spring 84 is interposed between the piston arm 83 and the clutch drum 6. The needle bearing 87 is interposed between the piston 82 and the piston arm 83, and keeps the piston 82 from rotating along with the piston arm 83. The arm indentation plate 88 is provided integrally with elastic accordion support members 89, 89, and inner and outer circumferential parts of the elastic accordion support members 89, 89 are pressure-fitted against the clutch drum 6. Leaked fluid from the piston arm 83 is prevented from flowing into the dry multi-plate clutch 7 by the arm indentation plate 88 and the elastic accordion support members 89, 89. That is, the arm indentation plate 88 and elastic accordion support members 89 sealed and immobilized at the position where the piston arm attaches to the clutch drum 6 serve to separate a wet space in which the slave cylinder 8 is disposed from the dry space in which the dry multi-plate clutch 7 is disposed.

As shown in FIG. 3, the piston arm 83 is constituted by a ring-shaped arm body 83a, and arm projections 83b projecting from the arm body 83a at four locations.

As shown in FIG. 3, the return spring 84 is constituted by a ring-shaped spring support plate 84a and a plurality of coil springs 84b affixed to the spring support plate 84a.

As shown in FIG. 2, the arm indentation plate 88 is pressed in place by the arm projections 83b of the piston arm 83. As shown in FIG. 3, the elastic accordion support members 89, 89 are integrally provided inside and outside the arm indentation plate 88.

A leaked/recovered fluid passage according to the first embodiment comprises a first bearing 12, a first seal member 31, a leaked fluid passage 32, a first recovered fluid passage 33, and a second recovered fluid passage 34, as shown in FIG. 2. Specifically, leaked fluid from the sliding part of the piston 82 passes through the first recovered fluid passage 33 and the second recovered fluid passage 34, which are sealed by the first seal member 31, and returns to the transmission unit T/M. In addition, leaked fluid from the sliding part of the piston arm 83 passes through the leaked fluid passage 32, which is sealed by an elastic divider member (the arm indentation plate 88 and elastic accordion support members 89, 89), and the first recovered fluid passage 33 and the second recovered fluid passage 34, which are sealed by the first seal member 31, and returns to the transmission unit T/M.

A bearing lubricant passage according to the first embodiment comprises a needle bearing 20, a second seal member 14, a first shaft core fluid passage 19, a second shaft core fluid passage 18, a lubricant passage 16, and a gap 17, as shown in FIG. 2. The bearing lubricant passage lubricates the bearings by carrying bearing lubricant from the transmission unit T/M through the needle bearing 20, the first bearing 12, which rotatably supports the clutch drum 6 with respect to the cylinder housing 81, and the needle bearing 87, which is interposed between the piston 82 and the piston arm 83, before returning it to the transmission unit T/M.

The second seal member 14 is disposed between the clutch hub 3 and the clutch drum 6, as shown in FIG. 2. The second seal member 14 serves to prevent bearing lubricant from flowing from the wet space in which the slave cylinder 8 is disposed into the dry space in which the dry multi-plate clutch 7 is disposed.

Configuration of the Dry Multi-plate Clutch

Figure 4:
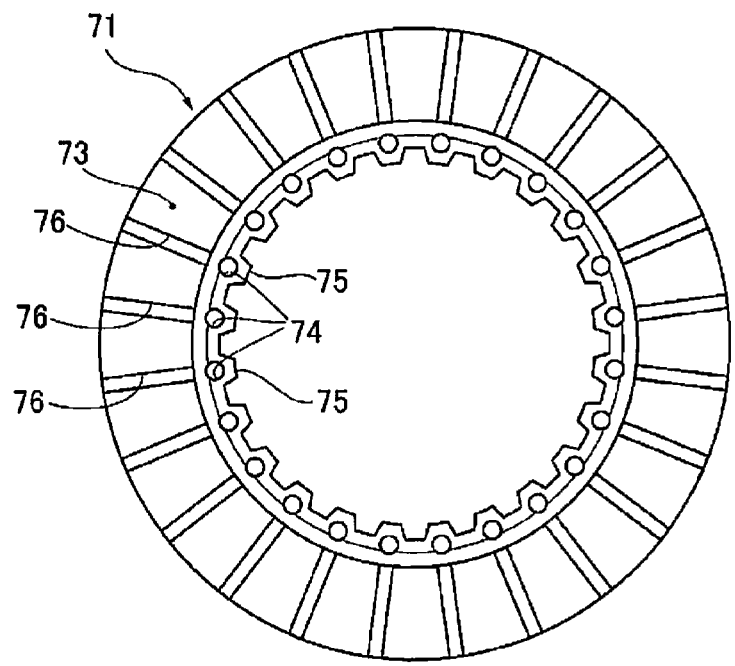
FIG. 4 is a head-on view of a drive plate for the dry multi-plate clutch of the hybrid drive force transmission device according to the first embodiment.
Figures 5A, 5B:
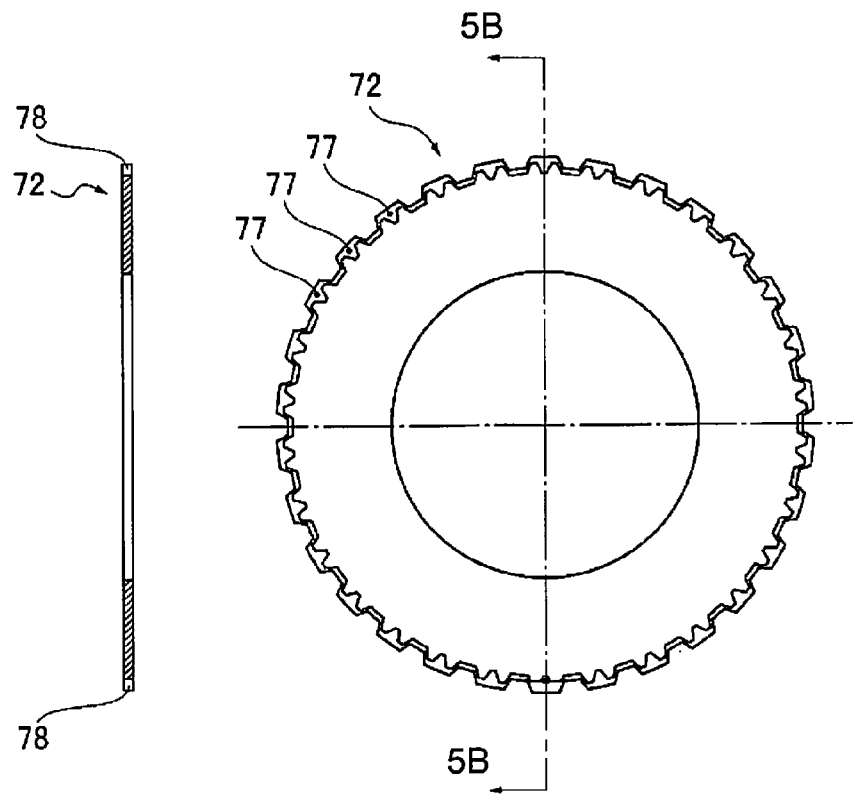
FIG. 5A is an elevational view of a driven plate for the dry multi-plate clutch of the hybrid drive force transmission device according to the first embodiment.
FIG. 5B is a cross-sectional view of the driven plate for the dry multi-plate clutch of the hybrid drive force transmission device according to the first embodiment as seen along section line 5A-5A of FIG. 5A.

FIGS. 4 and 5 shows various constituent members of the dry multi-plate clutch 7. The configuration of the dry multi-plate clutch 7 will now be described with reference to FIGS. 2, 4, and 5.

The dry multi-plate clutch 7 connects and disconnects the transmission of drive force from the engine Eng, and, as shown in FIG. 2, is disposed within a clutch chamber 64 constituted by the closed space surrounded by the clutch hub shaft 2, the clutch hub 3, a clutch cover 6, and a front cover 60. The dry multi-plate clutch 7 is provided with the drive plate 71 (first clutch plate), the driven plate 72 (second clutch plate), a frictional face 73, and a front cover 60 (cover member) as component members.

The drive plate 71 is splined to the clutch hub 3, and comprises ventilation holes 74 at the position of the splined connection with the clutch hub 3 for admitting an air stream flowing in the axial direction. As shown in FIG. 4, the drive plate 71 comprises the ventilation holes 74 at the positions of those spline tooth projections 75, out of spline teeth that intermesh with splines on the clutch hub 3, that project on an inner diameter side of the plate, these positions being located to the inside of face grooves 76 formed in the frictional face 73. As shown in FIG. 2, a plurality of drive plates 71 (four in the first embodiment) are arranged so that their ventilation holes 74 communicate in the axial direction.

The driven plate 72 is splined to the clutch drum 6, and comprises ventilation gaps 77 for admitting an air stream flowing in the axial direction at the position of the splined connection with the clutch drum 6. As shown in FIG. 5, the ventilation gaps 77 form indentations 78 positioned in the center of spline tooth projections projecting on the outer diameter side of the plate, and are set by the open interstitial spaces formed upon engagement with the spline teeth of the clutch drum 6.

A frictional face 73 is provided on both sides of the drive plate 71, and frictional surfaces thereof are pressed against the surface of the driven plate 72 when the clutch is engaged. As shown in FIG. 4, the frictional face 73 is a ring-shaped plate member, and comprises face grooves 76 formed by lines radiating in the radial direction from positions on the inner diameter toward positions on the outer diameter. The face grooves 76 are of a depth such that they retain their grooved shape even if a certain degree of face wear occurs.

The front cover 60 is integrally affixed to the cylinder housing 81, which is a motionless member supported by the first bearing 12 with respect to the clutch drum shaft 4, and covers the motor/generator 9 and the dry multi-plate clutch 7. Specifically, the front cover 60 is a motionless member that is supported with respect to the clutch hub shaft 2 by a second bearing 13 and is sealed by a cover seal 15. That part of the interior space formed by the front cover 60 and cylinder housing 81 being covered nearer a clutch rotary shaft CL (equivalent to a rotor shaft) constitutes the clutch chamber 64 in which the dry multi-plate clutch 7 is housed, and the outer space of the clutch chamber 64 constitutes a motor chamber 65 in which the motor/generator 9 is housed. The clutch chamber 64 and the motor chamber 65, which are divided by a dust seal member 62, are dry spaces into which the flow of oil is blocked.

Ejection of Wear Debris by Air Stream Effect

The manner in which wear debris is ejected from the dry multi-plate clutch 7 by an air stream effect will now be described with reference to FIGS. 2 and 4-6.

The ejection of wear debris via an air stream effect of the dry multi-plate clutch 7 involves the ventilation holes 74, the ventilation gaps 77, and the face grooves 76.

The ventilation holes 74 are formed at the locations of the spline joints between the drive plate 71 and the clutch hub 3, and admit an air stream flowing in the axial direction (FIG. 4).

The ventilation gaps 77 are formed at the locations of the spline joints between the driven plate 72 and the clutch drum 6, and admit an air stream flowing in the axial direction (FIG. 5).

The face grooves 76 are formed by lines radiating in the radial direction from positions on the inner diameter of the frictional face 73 toward positions on the outer diameter thereof, and admit an air stream flowing in the radial direction (FIG. 4).

Figure 6:
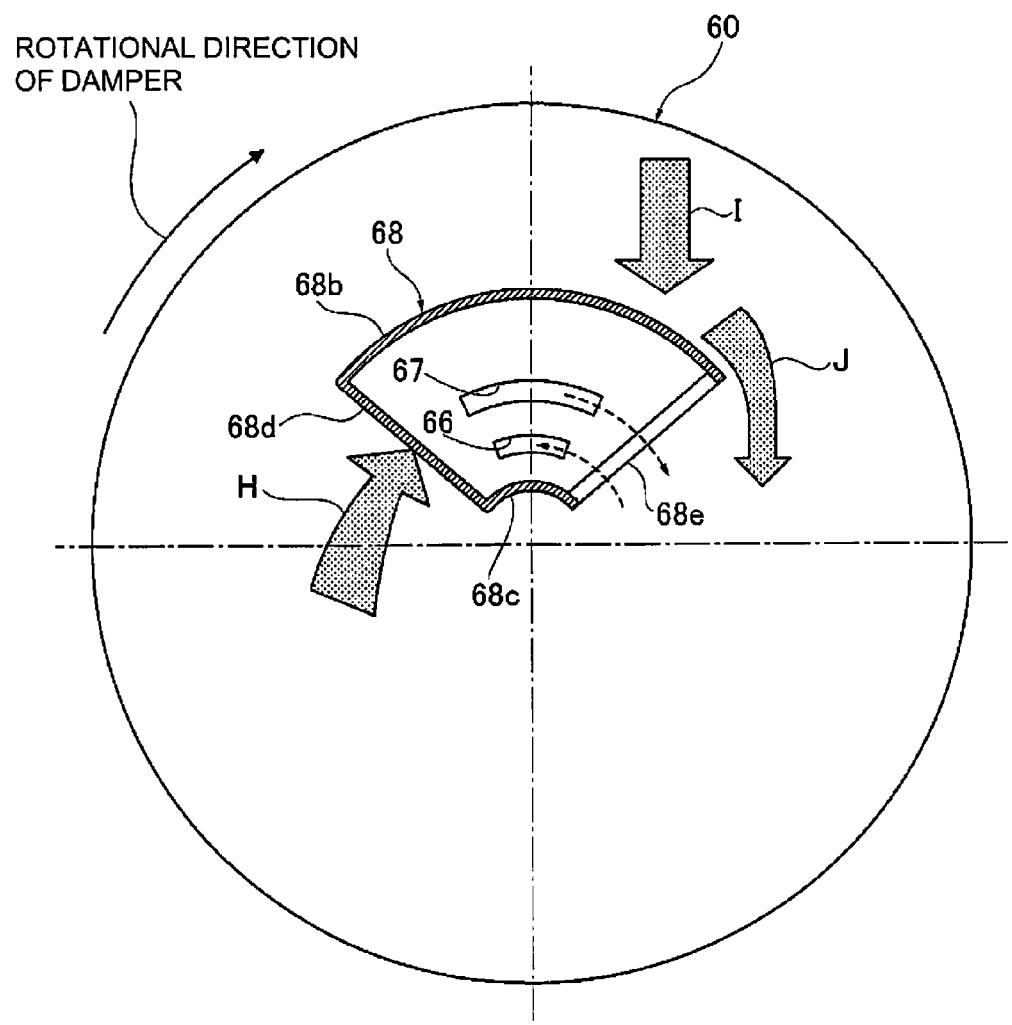
FIG. 6 is a side view of a front cover on which a splash guard for the dry multi-plate clutch of the hybrid drive force transmission device according to the first embodiment is provided.

The ejection of wear debris via an air stream effect of the front cover 60 involves an air intake port 66, an air venting port 67, and a splash guard 68, as shown in FIGS. 2 and 6.

The air intake port 66 is a hole for drawing air into the clutch chamber 64 via the closed space, and, out of the front cover 60 disposed on the side of the dry multi-plate clutch 7, is provided extending in the axial direction toward the inner diameter side of the clutch plates 71, 72, as shown in FIG. 2. The specific radial direction position of the air intake port 66 is matched to the radial direction position of the dry multi-plate clutch 7 in which the ventilation holes 74 for admitting the air stream flowing in the axial direction are set. As shown in FIG. 6, the air intake port 66 is an arcuate hole formed in the front cover 60.

The air venting port 67 is a hole for venting an air stream from within the clutch chamber 64 via the closed space to the open air, and, out of the front cover 60 disposed on the side of the dry multi-plate clutch 7, is provided extending in the axial direction to the outer diameter side of the clutch plates 71, 72, as shown in FIG. 2. The specific radial direction position of the air venting port 67 is matched to the radial direction position of the dry multi-plate clutch 7 in which the ventilation gaps 77 for admitting the air stream flowing in the axial direction are set. As shown in FIG. 6, the air venting port 67 is an arcuate hole formed in the front cover 60, and has a greater area than the air intake port 66.

As shown in FIG. 2, the splash guard 68 covers the air intake port 66 and the air venting port 67 of the front cover 60 in order to prevent the infiltration of water from the air intake port 66 and the air venting port 67 provided in the front cover 60 into the clutch chamber 64. The damper 21, which attenuates variations in drive force from the engine Eng constituting the drive source, is disposed at a position outside the splash guard 68. Specifically, the splash guard 68 is provided with a covering guard surface 68a, an outer circumferential guard surface 68b, an inner circumferential guard surface 68c, a side guard surface 68d, and an opening 68e.

As shown in FIGS. 2 and 6, the shape of the side surface of the covering guard surface 68a conforms to the shape of the outer surface of the front cover 60, and the front surface has a fan shape having an angle of spread of roughly 90° so as to cover the air intake port 66 and the air venting port 67. The covering guard surface 68a prevents the infiltration of water from the head-on direction (axial direction) in the air intake port 66 and the air venting port 67.

As shown in FIGS. 2 and 6, the outer circumferential guard surface 68b has an arc shape that closes off the outer circumference of the covering guard surface 68a. The outer circumferential guard surface 68b prevents the infiltration of water from above (in the radial direction) into the air intake port 66 or the air venting port 67 when water drawn up by the splash guard 68 falls down.

As shown in FIGS. 2 and 6, the inner circumferential guard surface 68c has an arc shape that closes off the inner circumference of the covering guard surface 68a. The inner circumferential guard surface 68c prevents the infiltration of water from below (in the radial direction) into the air intake port 66 or the air venting port 67 when water is splashed from the direction of the clutch rotary shaft CL.

As shown in FIG. 6, the side guard surface 68d has the shape of a straight line in the radial direction that closes off part of the covering guard surface 68a. The side guard surface 68d is disposed upstream of the damper 21 with respect to the direction of rotation, and prevents the infiltration of water from the lateral direction (in the circumferential direction) into the air intake port 66 and the air venting port 67 when water is drawn up by the rotation of the damper 21.

As shown in FIG. 6, the opening 68e has the shape of a straight line in the radial direction leaving the other side of the covering guard surface 68a in order to take in air through the air intake port 66 and eject air streams from the air venting port 67. The opening 68e is disposed downstream of the damper 21 with respect to the direction of rotation. When water is drawn up by the rotation of the damper 21, the fact that the opening faces in the direction opposite that in which water is drawn up keeps water from directly falling upon the air intake port 66 or the air venting port 67. In addition, as shown in FIG. 6, the direction in which the opening 68e faces is angled so that the opening is tilted with respect to the vertical direction so as to face downwards when the splash guard is installed in a vehicle (i.e., an inclination of roughly) 45°.

Next, the operation of the present invention will be described. The description of the operation of the hybrid drive force transmission device according to the first embodiment will be divided into descriptions of the engagement and disengagement of the clutch by the slave cylinder, the ejection of wear debris by the air stream effect, and the prevention of water infiltration and ensuring of wear debris ejection by the splash guard.

Engagement and Disengagement of the Clutch by the Slave Cylinder

The engagement and disengagement of the dry multi-plate clutch 7 by the slave cylinder 8 will now be described with reference to FIG. 2.

When the dry multi-plate clutch 7 is engaged by the slave cylinder 8, clutch hydraulic pressure generated by the transmission unit T/M is supplied to the cylinder fluid chamber 86 via the first clutch pressure fluid passage 85 formed in the cylinder housing 81. As a result, hydraulic pressure force equivalent to the product of the hydraulic pressure and the area subjected to pressure acts upon the piston 82, causing the piston 82 to make a stroke in the rightward direction as seen in FIG. 2 against the biasing force of the return spring 84 interposed between the piston arm 83 and the clutch drum 6. Engagement force equivalent to the difference between the hydraulic pressure force and the biasing force is then transmitted from the piston 82 to the needle bearing 87, from there to the piston arm 83, and finally to the arm indentation plate 88, thereby pressing the drive plate 71 and the driven plate 72 together and engaging the dry multi-plate clutch 7.

When the engaged dry multi-plate clutch 7 is disengaged, the operating fluid being supplied to the cylinder fluid chamber 86 drains through the clutch pressure fluid passage 85 into the transmission unit T/M, reducing the hydraulic pressure force acting upon the piston 82, in turn causing the biasing force exerted by the return spring 84 to exceed the hydraulic pressure force, thus causing the integrated piston arm 83 and arm indentation plate 88 to make a stroke in the leftward direction as seen in FIG. 2. The engagement force being transmitted to the arm indentation plate 88 is thereby released, disengaging the dry multi-plate clutch 7.

Ejection of Wear Debris by Air Stream Effect

As the dry multi-plate clutch 7 is repeatedly engaged and disengaged, as described above, the surface of the frictional face will slough off and accumulate between the clutch plates 71, 72 as wear debris; thus, the wear debris must be ejected from the clutch. The ejection of wear debris via an air stream effect reflecting this need will now be described with reference to FIG. 7.

When at least one of the clutch hub 3 and the clutch drum 6 rotates around the clutch rotary shaft CL, the presence of the face grooves 76 on the frictional face 73 generates a centrifugal fan effect using the clutch hub 3, which has a frictional face 73 on both sides, as blades.

Figure 7:
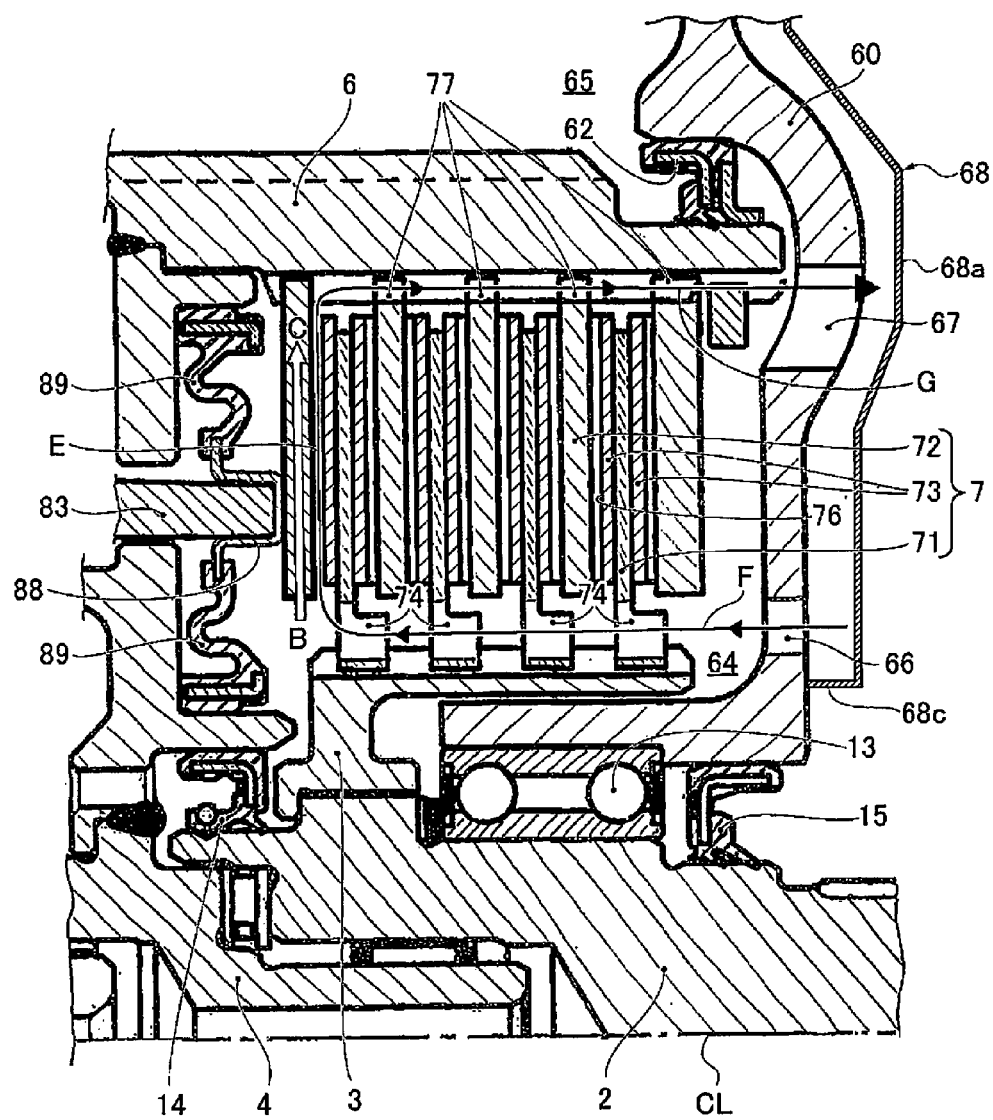
FIG. 7 is an operational illustration of wear debris being ejected in the hybrid drive force transmission device according to the first embodiment.

As shown in FIG. 7, this centrifugal fan effect sends air in a radial direction from a zone B in the area by the clutch hub 3 to a zone C in the area by the clutch drum 6, increasing the air pressure near the clutch drum 6 (positive pressure), and decreasing the air pressure near the clutch hub 3 (negative pressure). The difference in air pressure generates a radial direction air stream E of air moving in the radial direction from the area by the clutch hub 3 to the area by the clutch drum 6. That is, the pressure at the inner diameter side of the dry multi-plate clutch 7 becomes less than atmospheric pressure (negative pressure), and the pressure at the outer diameter side of the dry multi-plate clutch 7 becomes greater than atmospheric pressure (positive pressure), creating a pressure relationship such that: air pressure at clutch outer diameter>atmospheric pressure>air pressure at clutch inner diameter.

The generation of this radial direction air stream E creates a difference in air pressure between the external air constituting the atmospheric pressure and the inner diameter side of the clutch constituting the negative pressure. Accordingly, as shown in FIG. 7, external air taken in through the air intake port 66 passes through various ventilation holes 74, creating an inner diameter-side axial direction air stream F that flows through the area by the clutch hub 3, where the air pressure is reduced.

The spline joint part of the driven plate 72 has low air resistance due to the presence of the extra space in order to ensure the movement of the plate. In addition, the presence of the ventilation gaps 77 for admitting axial direction air streams at the location of the spline joint between the driven plate 72 and the clutch drum 6 further reduces air resistance. The generation of the radial direction air stream E creates a difference in air pressure between the outer diameter side of the clutch constituting the positive pressure and the external air constituting the atmospheric pressure. Accordingly, as shown in FIG. 7, the air stream changing its course from the inside diameter-side axial direction to the radial direction and flowing into the area by the clutch drum 6 generates an outer diameter-side axial direction air stream G passing from the ventilation gaps 77 at the spline joint through the air venting port 67 to the external air.

As shown by the arrows in in FIG. 7, the generation of this air current creates an air stream flowing along a path (F to E to G) passing from the external air through the air intake port 66, the clutch inner diameter-side axial direction gap (ventilation holes 74, etc.), the clutch radial direction gap (face grooves 76, etc.), the clutch outer diameter side axial direction gap (ventilation gaps 77, etc.), and the air venting port 67 back to the external air. FIG. 7 only shows the radial direction air stream E closest to the piston, but a plurality of radial direction air streams E is generated at the locations where the face grooves 76 are present. Wear debris from the surface of the frictional faces 73 generated by repeated clutch engagement and disengagement of the clutch is thereby carried along this air stream (F to E to G) and ejected outside.

Prevention of Water Infiltration and Ensuring of Wear Debris Ejection by Splash Guard The provision of the air intake port 66 and the air venting port 67 in the front cover 60, as discussed above, necessitates measures to prevent the infiltration of water into the clutch chamber 64. However, wear debris ejection cannot be ensured if the air intake port 66 and the air venting port 67 are completely covered. It is therefore necessary to strike a balance between preventing water infiltration and ejecting wear debris. The water infiltration prevention and wear debris ejection performed by the splash guard 68 in recognition of this need will now be described.

The front cover 60 disposed on the side of the dry multi-plate clutch 7 comprises the air intake port 66 for taking external air into the closed space constituted by the clutch chamber 64, and the air venting port 67 for ejecting an air stream from within the clutch chamber 64 to the external air. The front cover 60 is also provided with the splash guard 68, which covers the air intake port 66 and the air venting port 67 and comprises the opening 68e.

Water having entered the damper chamber in which the damper 21 is disposed is prevented by the splash guard 68 from infiltrating the clutch chamber 64 through the air intake port 66 or the air venting port 67.

Specifically, water approaching the splash guard 68 from head-on (i.e., in an axial direction) is caught by the fan-shaped covering guard surface 68a, preventing the water from entering the air intake port 66 or the air venting port 67. Water approaching the splash guard 68 from below (i.e., in a radial direction) is caught by the arcuate inner circumferential guard surface 68c, preventing the water from entering the air intake port 66 or the air venting port 67.

When water pooling in the damper chamber is drawn up by the rotation of the damper 21, the water is drawn in the rotational direction of the damper 21, as shown by arrow H in FIG. 6. Water approaching the splash guard 68 from upstream in the rotational direction of the damper 21 is caught by the closed side guard surface 68d, preventing water from entering the air intake port 66 or the air venting port 67. The disposition of the opening 68e in the splash guard 68 downstream of the damper 21 with respect to the direction of rotation means that, when water is drawn up by the rotation of the damper 21, the fact that the opening faces in the direction opposite that in which water is drawn up (the direction indicated by arrow H in FIG. 6) keeps water from directly falling upon the air intake port 66 or the air venting port 67.

Water pooling in the damper chamber may be lifted to a position higher than the splash guard 68 due to the rotation of the damper or shaking in the unit. Water lifted above the splash guard 68 in this way falls down toward the splash guard 68, as indicated by arrow I in FIG. 6, but is caught by the closed arcuate outer circumferential guard surface 68b. Because the opening 68e is angled so as to be oriented downward with respect to the vertical direction when the splash guard is installed in a vehicle, the water reliably circumvents the opening 68e and falls downward, as indicated by arrow J in FIG. 6. The infiltration of water falling from a position higher than the splash guard 68 into the air intake port 66 or the air venting port 67 is thereby prevented.

The presence of the opening 68e for taking in external air through the air intake port 66 and ejecting an air stream through the air venting port 67 in the splash guard 68 means that the generation of an air stream for ejecting wear debris from the surface of the frictional faces 73 is not impeded.

In other words, the opening 68e is added to the flow of the air stream formed by the pressure relationship of clutch outer diameter-side air pressure>atmospheric pressure>clutch inner diameter-side air pressure. In other words, despite the addition of the splash guard 68, the air stream path (F to E to G) flowing from the external air through the opening 68e, the air intake port 66, the clutch inner diameter-side axial direction gap, the clutch radial direction gap, the clutch outer diameter side axial direction gap, the air venting port 67, and the opening 68e back to the external air is still formed.

Next, the effects of the first embodiment will be described. The hybrid drive force transmission device according to the first embodiment yields the following effects.

(1) A drive force transmission device in which a dry clutch (the dry multi-plate clutch 7) for connecting and disconnecting the transmission of drive force is disposed within a closed space (the clutch chamber 64), wherein: the dry clutch (dry multi-plate clutch 7) is provided with: a first clutch plate (the drive plate 71) splined to a clutch hub 3; a second clutch plate (the driven plate 72) splined to a clutch drum 6; a frictional face 73 provided on either the first clutch plate (drive plate 71) or the second clutch plate (driven plate 72), a frictional surface thereof being pressed against a surface of the other plate when the clutch is engaged; a cover member (the front cover 60) having an air intake port 66 for taking external air into the closed space (clutch chamber 64), and an air venting port 67 for ejecting an air stream from within the closed space (clutch chamber 64) into the external air; a splash guard 68 provided so as to cover the air intake port 66 and the air venting port 67 of the cover member (front cover 60), and having an opening for drawing in external air through the air intake port 66 and venting an air stream from the air venting port 67. As a result, it is possible to prevent the infiltration of water into the closed space (clutch chamber 64) in which the dry clutch (dry multi-plate clutch 7) is disposed, and ensure that wear debris from the dry clutch (dry multi-plate clutch 7) is ejected to the exterior.

(2) A damper 21 for attenuating variations in drive force from the engine Eng constituting the drive source is disposed at a position outside the splash guard 68; and in the splash guard 68, a side guard surface 68d located upstream with respect to the rotational direction of the damper 21 is closed, and the opening 68e is provided in a side guard surface located downstream with respect to the rotational direction of the damper 21. As a result, in addition to the effects described in (1) above, water can be prevented from infiltrating through the opening 68e into the air intake port 66 or the air venting port 67 when water drawn up by the rotation of the damper 21 approaches the splash guard 68.

(3) The opening 68e in the splash guard 68 is angled so as to face in a horizontal direction or be oriented downward with respect to the vertical direction when the splash guard is installed in a vehicle. As a result, in addition to the effects described in (2) above, water can be prevented from infiltrating through the opening 68e into the air intake port 66 or the air venting port 67 when water lifted to a position higher than the splash guard 68 falls downward.

Second Embodiment

In the second embodiment, the opening in the splash guard is defined with respect to the vertical axis.

Figure 8:
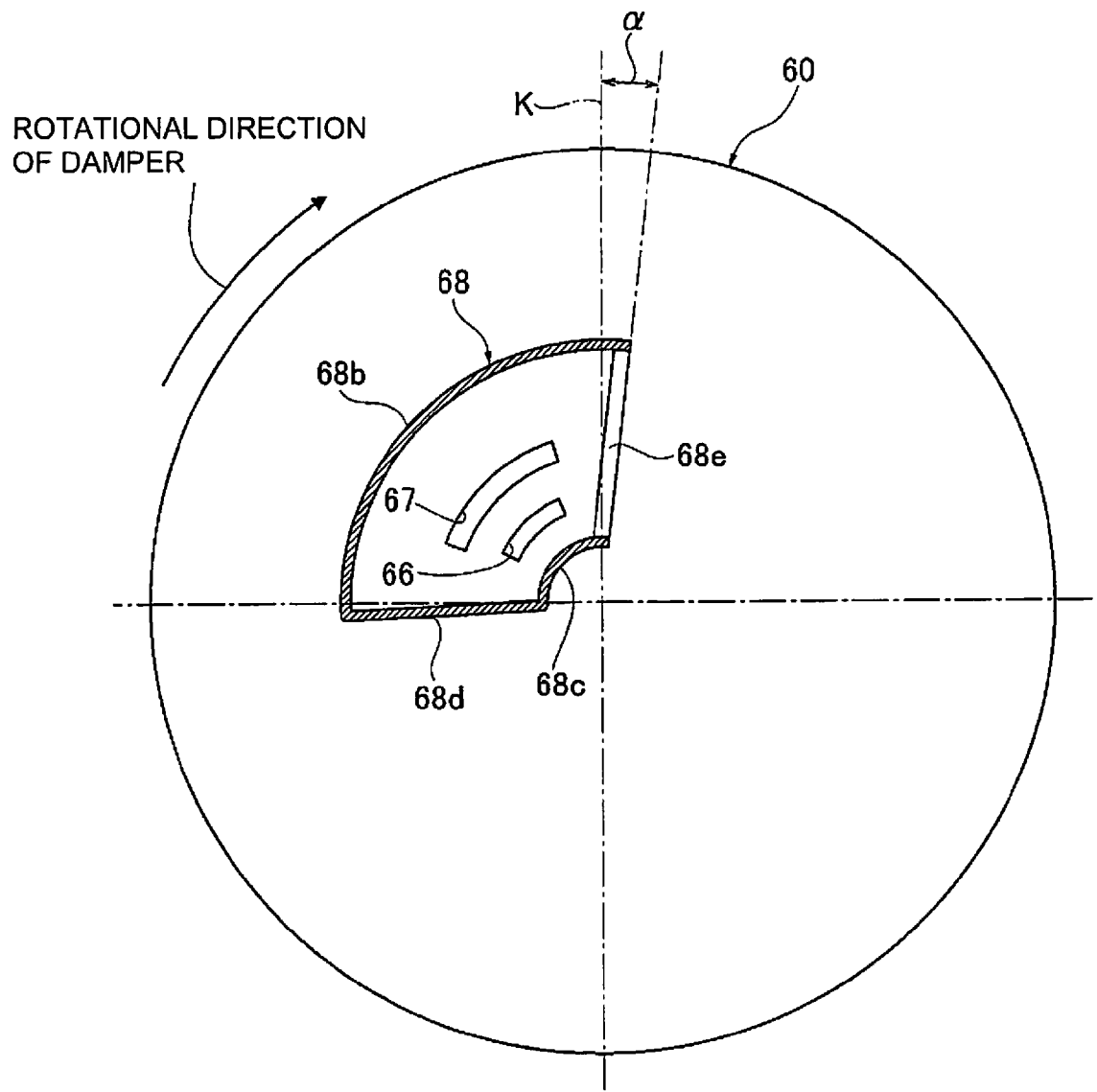
FIG. 8 is an illustration of the direction of an opening in a splash guard of a hybrid drive force transmission device according to a second embodiment.

First, the configuration of the second embodiment will be described. FIG. 8 is an illustration of the direction of an opening in a splash guard of a hybrid drive force transmission device according to the second embodiment.

As shown in FIG. 8, the direction in which the opening 68e in the splash guard 68 according to the second embodiment faces is angled so as to be inclined by a predetermined angle α in the rotational direction of the damper 21 with respect to a vertical axis K.

The other features of the second embodiment are similar to those of the first embodiment; illustration and description thereof will thus be omitted. The operation thereof is also similar to that of first embodiment, and description thereof will also be omitted.

Next, the effects of the second embodiment will be described. The hybrid drive force transmission device according to the second embodiment yields the following effects.

(4) The direction in which the opening 68e in the splash guard 68 faces is set to an angle so as to be inclined in the rotational direction of the damper 4 with respect to a vertical axis K by a predetermined angle α. As a result, in addition to the effects yielded by the first embodiment as described in (2) above, water can be prevented from infiltrating through the opening 68e into the air intake port 66 or the air venting port 67 when water lifted to a position higher than the splash guard 68 falls downward.

The foregoing has been a description of first and second embodiments of the drive force transmission device according to the present invention, but the specific configuration of the present invention is not limited to these embodiments, and various modifications and additions may be made to the design to the extent that they do not depart from the spirit of the invention as set forth in the claims.

In the first embodiment, a dry multi-plate clutch was used as the dry clutch, but a single-plate dry clutch may also be used.

In the first embodiment, the dry clutch was a normally open clutch. However, a normally closed dry clutch utilizing a diaphragm spring or the like may also be used.

In the first embodiment, the drive plate 71 was splined to the clutch hub 3, and the driven plate 72 was splined to the clutch drum 6. However, it is also possible for the drive plate to be splined to the clutch drum and the driven plate to be splined to the clutch hub.

In the first embodiment, the drive plate 71 comprised a frictional face 73. However, it is also possible for the driven plate to comprise a frictional face.

In the first embodiment, the ventilation holes 74, ventilation gaps 77, face grooves 76, and the like were provided in order to secure an air stream path within the dry multi-plate clutch 7. However, even without the presence of ventilation holes 74 or ventilation gaps 77, the gaps present at the spline joint create a path for axial direction air streams, and the gap between the plates forms a path for radial direction air streams. Accordingly, it is not essential to provide the ventilation holes 74, ventilation gaps 77, face grooves 76, or the like.

In the first and second embodiments, the direction in which the opening 68e in the splash guard 68 faces is angled so that the opening faces downward with respect to the vertical axis when the splash guard is installed in a vehicle. However, any splash guard is acceptable as long as the opening is angled so that the infiltration of water from the opening into the air intake port or the air venting port when water lifted to a position higher that the splash guard falls downward is prevented. In other words, the direction in which the opening faces may be set to an angle anywhere from one such that the opening is only slightly oriented downward with respect to the vertical axis when the splash guard is installed in a vehicle to one such that the opening is orthogonal to the vertical axis (i.e., completely downward-facing) when the splash guard is installed in a vehicle.

The first and second embodiments feature examples of application to a hybrid drive force transmission device equipped with an engine and a motor/generator, in which a dry multi-plate clutch is used to shift driving modes. However, the present invention can also be applied to an engine drive force transmission device, such as that for an engine vehicle, in which only an engine is used as a drive source and a dry clutch is used to start off. The present invention can also be applied to a motor drive force transmission device, such as that for an electric vehicle or a fuel cell vehicle, in which only a motor/generator is used as a drive source and a dry clutch is used to start off.

The invention claimed is:

1. A drive force transmission device comprising:
    a clutch hub;
    a clutch drum member;
    a damper arranged to attenuate variations in a drive force from a drive source; and
    a dry clutch disposed within a closed space between the clutch hub and the clutch drum for selectively connecting and disconnecting the drive force, the dry clutch including:
        a first clutch plate connected to the clutch hub;
        a second clutch plate connected to the clutch drum;
        one of the first and second clutch plates having a frictional surface being pressed against a surface of the other of the first and second plates when the dry clutch is engaged;
    a cover member having an air intake port arranged to draw external air into the closed space, and an air venting port arranged to vent an air stream from the closed space into the external air; and
    a splash guard including a covering guard surface overlying the air intake port and the air venting port of the cover member, and a side guide surface having an opening arranged to draw in the external air through the air intake port and arranged to vent the air stream from the air venting port, and
    the damper being disposed at a position outside of the splash guard, and
    the side guard surface being closed along an upstream portion with respect to a rotational direction of the damper, and the opening being located along a downstream portion with respect to the rotational direction of the damper.

2. The drive force transmission device as claimed in claim 1, wherein
    the opening in the side guard surface is angled so as to face in a horizontal direction or be oriented downward with respect to a vertical axis when the splash guard is installed in a vehicle.

3. The drive force transmission device as claimed in claim 1, wherein
    the opening in the side guard surface faces in a direction that is angled so as to be inclined by a predetermined angle in the rotational direction of the damper with respect to a vertical axis.

* * * * *